United States Patent [19]
Kimtantas

[11] Patent Number: 5,686,056
[45] Date of Patent: Nov. 11, 1997

[54] METHODS AND APPARATUS FOR PURIFYING HYDROGEN SULFIDE

[75] Inventor: Charles L. Kimtantas, Sugar Land, Tex.

[73] Assignee: Bechtel Group, Inc., San Francisco, Calif.

[21] Appl. No.: 597,055

[22] Filed: Feb. 5, 1996

[51] Int. Cl.$^6$ .................. C01B 17/04; C01B 17/16
[52] U.S. Cl. ............... 423/562; 423/563; 423/571; 95/135
[58] Field of Search .................. 423/578.1, 567.1, 423/576.2, 573.1, 563, 242.1, 564, 571; 95/273, 901, 902, 903, 49, 135; 502/517

[56] References Cited

U.S. PATENT DOCUMENTS

| | | | |
|---|---|---|---|
| 2,214,859 | 9/1940 | Maude et al. | 423/564 |
| 2,743,153 | 4/1956 | Marsh et al. | 423/564 |
| 2,863,725 | 12/1958 | Maude et al. | 423/564 |
| 3,634,028 | 1/1972 | Hohne | 23/2 S |
| 3,758,608 | 9/1973 | Rigdon et al. | 260/667 AD |
| 3,838,979 | 10/1974 | Sims | 23/293 S |
| 3,855,386 | 12/1974 | Moore | 423/210.5 |
| 3,880,986 | 4/1975 | Beavon | 423/574 |
| 3,904,387 | 9/1975 | Kertamus et al. | 48/210 |
| 4,014,815 | 3/1977 | Gamble, Jr. et al. | 252/412 |
| 4,020,235 | 4/1977 | Giuffre et al. | 428/443 |
| 4,056,447 | 11/1977 | Giuffre et al. | 204/98 |
| 4,131,437 | 12/1978 | Campbell et al. | 55/53 |
| 4,250,151 | 2/1981 | Johnson | 423/230 |
| 4,304,570 | 12/1981 | Kleeberg et al. | 23/293 S |
| 4,332,774 | 6/1982 | Drum et al. | 422/111 |
| 4,483,844 | 11/1984 | Cabanaw | 423/574 R |
| 4,511,544 | 4/1985 | Connell et al. | 423/224 |
| 4,612,020 | 9/1986 | Fischer et al. | 55/40 |
| 4,729,887 | 3/1988 | Pendergraft | 423/564 |
| 4,755,372 | 7/1988 | Baker | 423/578 R |
| 4,764,192 | 8/1988 | Heisel et al. | 55/269 |
| 4,816,225 | 3/1989 | Mathur et al. | 422/262 |
| 4,844,720 | 7/1989 | Pendergraft et al. | 55/73 |
| 4,849,204 | 7/1989 | Voirin et al. | 423/578 R |
| 5,080,695 | 1/1992 | Kassarjian | 55/53 |
| 5,122,351 | 6/1992 | Hardison | 423/220 |
| 5,173,285 | 12/1992 | Takenaka et al. | 423/563 |
| 5,226,934 | 7/1993 | Lefren | 55/73 |

FOREIGN PATENT DOCUMENTS 284210  11/1990  Germany ................. 423/578.1

Primary Examiner—Gary P. Straub
Assistant Examiner—Timothy C. Vanoy
Attorney, Agent, or Firm—Townsend and Townsend and Crew

[57] ABSTRACT

The invention provides methods for purifying hydrogen sulfide gas having impurities therein. In one exemplary method, the hydrogen sulfide gas is purified by passing the gas through a filter media, with at least some of the impurities being trapped within the filter media. A catalyst may also be provided to break down some of the impurities to hydrogen sulfide and sulfur, so that the sulfur may be trapped and collected within the filter media.

18 Claims, 2 Drawing Sheets

METHODS AND APPARATUS FOR PURIFYING HYDROGEN SULFIDE

BACKGROUND OF THE INVENTION

This invention relates generally to the production of hydrogen sulfide. More particularly, the invention relates to the removal of impurities within hydrogen sulfide gas which is produced by contacting hydrogen gas with liquid sulfur.

Hydrogen sulfide is an important chemical compound which is useful in a variety of applications. For example, hydrogen sulfide is used to make mercaptans, which are often added to natural gas to provide the natural gas with an odor so that gas leaks can more readily be detected. Hydrogen sulfide is also used to make additives which are added to lubrication oils; to make NaSH (Sodium Hydrosulfide) which serves as a bleaching agent and chemical reagent; and other sulfur based reagents.

One commercially practiced way of producing hydrogen sulfide gas is by contacting molten sulfur with heated hydrogen gas. One drawback to producing hydrogen sulfide in this manner is that the resulting hydrogen sulfide gas includes a variety of impurities, usually on the order of about 400 parts per million or more. For example, some liquid sulfur may be entrained in the hydrogen sulfide gas, i.e. some small liquid sulfur particles may be carried in the gas stream, usually caused by bubbling the hydrogen sulfide gas through a liquid, as in a distillation tower or kettle reboiler. Further, some of the sulfur may chemically react or become bonded with the hydrogen sulfide forming a hydrogen sulfide-sulfur polymer ($H_2S_x$). The existence of such impurities reduces the quality of the hydrogen sulfide and can limit its usefulness.

Another drawback of the presence of sulfur is that the sulfur tends to solidify when cooled and eventually falls out of the product stream. Solidification of the sulfur in this manner is undesirable in that it leaves sulfur deposits on downstream equipment.

Hence, for these and other reasons it would be desirable to provide methods and apparatus which would overcome or greatly reduce these and other problems when producing hydrogen sulfide. In particular, it would be desirable to provide methods and apparatus which would greatly reduce the amount of impurities in the hydrogen sulfide. In some cases, it may be desirable to simply prevent the sulfur within the hydrogen sulfide gas from solidifying and depositing on downstream equipment.

SUMMARY OF THE INVENTION

The invention provides methods and apparatus for purifying hydrogen sulfide gas having impurities therein. In one exemplary method, the hydrogen sulfide gas is purified by passing the hydrogen sulfide gas through a filter media. As the hydrogen sulfide gas passes through the filter media, at least some of the impurities are trapped within the filter media. Preferably, the filter media includes a plurality of irregularly shaped internal pores into which the impurities are trapped. A variety of filter media may be employed to trap the impurities including a molecular sieve, a sand trap, a carbon bed activated alumina (such as that used in dehydration and claus sulfur recovery unit catalysts), and the like, with the mole sieve being preferred. Such filter media may be used alone or in combination to purify the hydrogen sulfide gas.

The method of the invention will be particularly well adapted for removing entrained sulfur particles and hydrogen sulfide-sulfur polymers within the hydrogen sulfide gas. The method will preferably remove a sufficient amount of impurities so that no more than about 10 ppm, more preferably no more than about 5 ppm, of impurities remain within the hydrogen sulfide gas after leaving the filter media.

In one aspect of the method, heated hydrogen gas is passed through a molecular sieve to remove the impurities which have accumulated when purifying the hydrogen sulfide gas. Preferably, the hydrogen gas will be passed through the molecular sieve in a direction that is opposite to the direction through which the hydrogen sulfide gas was initially passed during the purifying process. In this way, the molecular sieve may be regenerated with hydrogen gas which in turn may be used to produce additional amounts of hydrogen sulfide gas.

In another aspect of the method, the hydrogen sulfide gas is introduced to a catalyst. The catalyst will preferably be selected so that it breaks down the hydrogen sulfide-sulfur polymer to hydrogen sulfide and sulfur. When broken down in this manner, the sulfur may be trapped and collected within the filter media. In a preferable aspect, the catalyst will comprise a solid body with which the hydrogen sulfide may interact. For example, such a solid body may comprise solid surfaces within a filter media, and particularly within a molecular sieve. In this way, the filter media may be employed to both adsorb the $H_2S_x$ and to break down the $H_2S_x$ to hydrogen sulfide and sulfur which will be collected in the filter media.

The invention further provides a method for transporting a hydrogen sulfide gas having sulfur particles therein. According to the method, the hydrogen sulfide gas is formed into a gas stream. The hydrogen sulfide gas is then heated to a temperature above its dew point to prevent the sulfur from solidifying and dropping out of the hydrogen sulfide gas stream. In this manner, undesirable sulfur deposits which would otherwise tend to accumulate on downstream equipment will be reduced.

The invention provides an exemplary apparatus for purifying hydrogen sulfide gas having impurities therein. The apparatus is particularly well-adapted for purifying the hydrogen sulfide gas when the impurities comprise entrained sulfur and/or a hydrogen sulfide-sulfur polymer. The apparatus includes a filter media through which the hydrogen sulfide gas is passed so that the filter media will collect the entrained sulfur. A catalyst may further be provided which breaks down the hydrogen sulfide-sulfur polymer to hydrogen sulfide and sulfur so that the sulfur may be collected in the filter media. An exemplary catalyst includes a foreign body, such as a molecular sieve, with which the hydrogen sulfide gas may interact.

The filter media will preferably include a plurality of irregularly shaped internal pores into which the impurities are trapped. Exemplary filter media include molecular sieves, activated alumina, sand traps, carbon beds, and the like.

In another aspect, the apparatus further includes a hydrogen source which supplies heated hydrogen gas to the filter media to remove accumulated impurities and thereby regenerate the filter media. The filter media will usually include a front end and a back end, and the hydrogen sulfide gas will be introduced into the front end. To regenerate the filter media, the heated hydrogen gas will be introduced through the back end so that the hydrogen gas passes through the filter media in a direction that is opposite to the direction through which the hydrogen sulfide gas was initially passed.

DETAILED DESCRIPTION OF THE SPECIFIC EMBODIMENTS

The invention provides methods and apparatus for purifying hydrogen sulfide gas having impurities therein. Such hydrogen sulfide gas is produced by contacting heated hydrogen gas with liquid sulfur.

When hydrogen sulfide gas is produced by combining hydrogen gas with liquid sulfur, the resulting hydrogen sulfide gas includes a variety of impurities, usually on the order of 400 ppm or more. For example, such impurities may include, among others, entrained sulfur and a hydrogen sulfide-sulfur polymer ($H_2S_x$). The presence of such impurities in the hydrogen sulfide gas can limit its usefulness in many applications.

The methods and apparatus of the invention are provided, in part, to remove such impurities. In one aspect, such impurities are removed by providing a filter media through which the hydrogen sulfide gas is passed. The filter media will preferably be a porous material which will collect and trap the impurities as the gas passes through the media. Exemplary filter media include molecular sieves, sand traps, carbon beds, activated alumina, and the like. The invention may employ only a single filter media, or alternatively a plurality of the same or different types of filter media. Molecular sieves which may be used with the invention include those having adsorptive surfaces provided by channels or cavities within a macrocrystal structure. Suitable molecular sieves are described in Robert H. Perry, et al., *Chemical Engineers' Handbook*, McGraw-Hill Book Company, 6th Edition, the disclosure of which is herein incorporated by reference.

In another aspect of the invention, impurities (and particularly hydrogen sulfide-sulfur polymers) are removed by passing the hydrogen sulfide gas over a catalyst. The catalyst is preferably selected so that the hydrogen sulfide-sulfur polymer is broken down to hydrogen sulfide and sulfur. The sulfur may then be removed from the hydrogen gas when passed through a filter media. Exemplary catalysts include solid bodies or surfaces with which the hydrogen sulfide gas may interact to break down the $H_2S_x$, and may comprise a filter media, such as a molecular sieve. In this way, the mole sieve may serve to both collect and trap the $H_2S_x$ as well as to break down the polymer to hydrogen sulfide and sulfur for collection in the molecular sieve.

Figure 1:
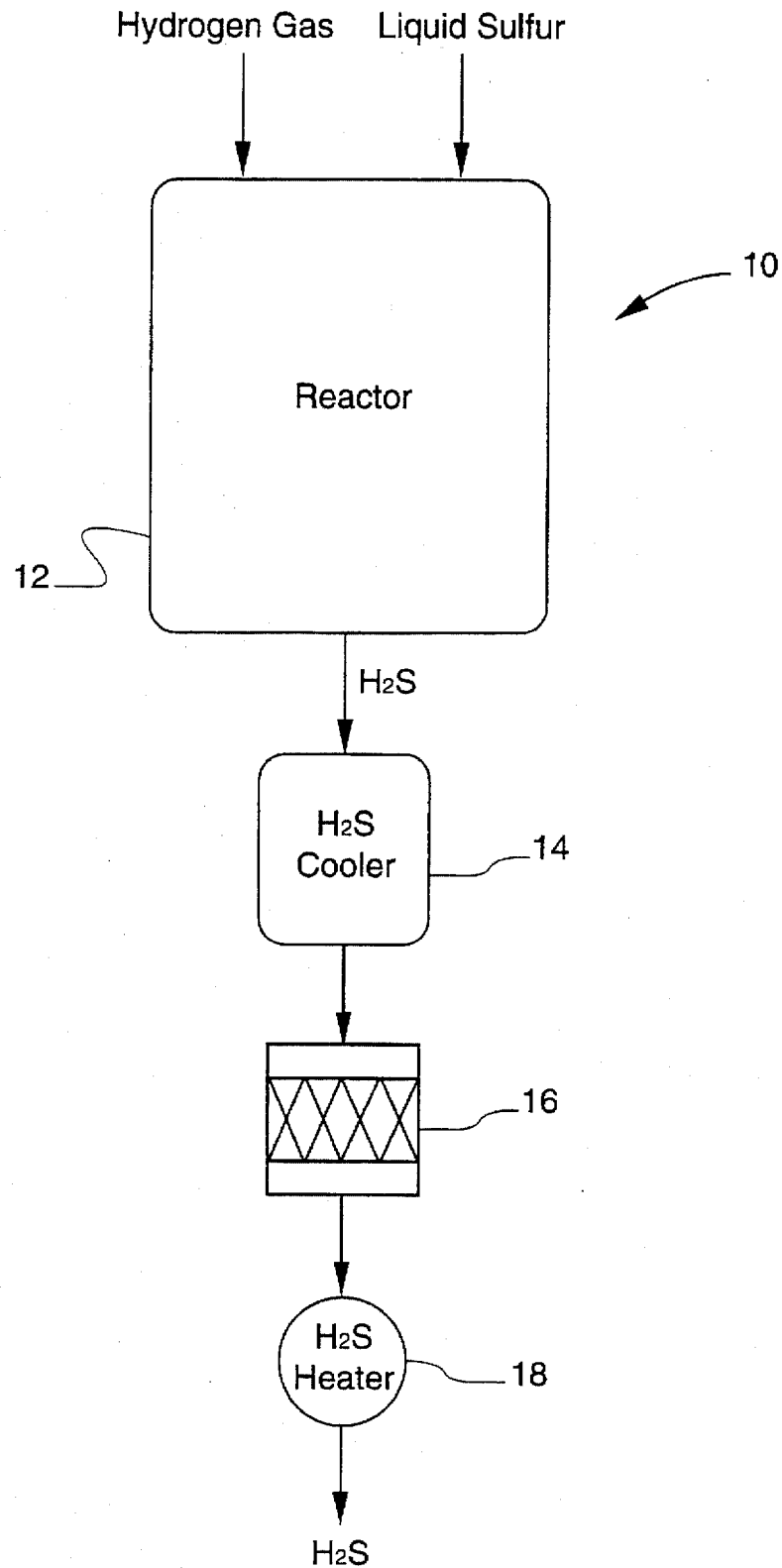
FIG. 1 is a schematic view of an exemplary system for producing and purifying hydrogen sulfide gas according to the present invention.

Referring to FIG. 1, an exemplary embodiment of a system 10 for producing and purifying hydrogen sulfide gas will be described. System 10 includes a reactor 12 into which hydrogen gas and liquid sulfur are introduced as shown. The hydrogen sulfide gas leaving reactor 12 passes into a hydrogen sulfide cooler 14 where much of the residual sulfur in the hydrogen sulfide gas stream is solidified. The cooled hydrogen sulfide gas leaving cooler 14 will still contain an undesirable amount of impurities, usually on the order of about 400 ppm or more. Such impurities can include, for example, entrained sulfur and $H_2S_x$. To assist in removing such impurities, a molecular sieve 16 is included downstream of cooler 14. As the hydrogen sulfide gas passes through the molecular sieve 16, entrained sulfur remaining in the hydrogen gas stream is trapped and collected. Preferably, the molecular sieve 16 will be selected such that no more than about 10 ppm, and more preferably no more than about 5 ppm, of impurities remain within the hydrogen sulfide gas when exiting molecular sieve 16.

Molecular sieve 16 will preferably also act as a catalyst, assisting in breaking down any hydrogen sulfide-sulfur polymers present in the hydrogen sulfide gas. As the hydrogen sulfide gas interacts with the solid surfaces within the molecular sieve, the catalyst will tend to break down the polymer into hydrogen sulfide and sulfur, with the sulfur being trapped and collected in molecular sieve 16.

System 10 may optionally include a hydrogen sulfide heater 18. If provided, heater 18 will preferably be located downstream of molecular sieve 16. Optionally, heater 18 may be provided in place of mole sieve 16. Heater 18 is provided to reduce the possibility that any residual sulfur which is in the hydrogen sulfide gas will solidify and drop out of the hydrogen sulfide gas where it will accumulate on downstream equipment. Heater 18 will preferably heat the hydrogen sulfide gas to a temperature above its dew point, usually to about 28° C. above the sulfur equilibrium temperature (the outlet temperature from cooler 14). Heating of the hydrogen sulfide gas in this manner will thus help prevent sulfur from dropping out of the product stream, even with a reduction in pressure (such as at the inlet to a compressor). After passing through the cleaning operation, the hydrogen sulfide gas is then metered and flows offsite.

Figure 2:
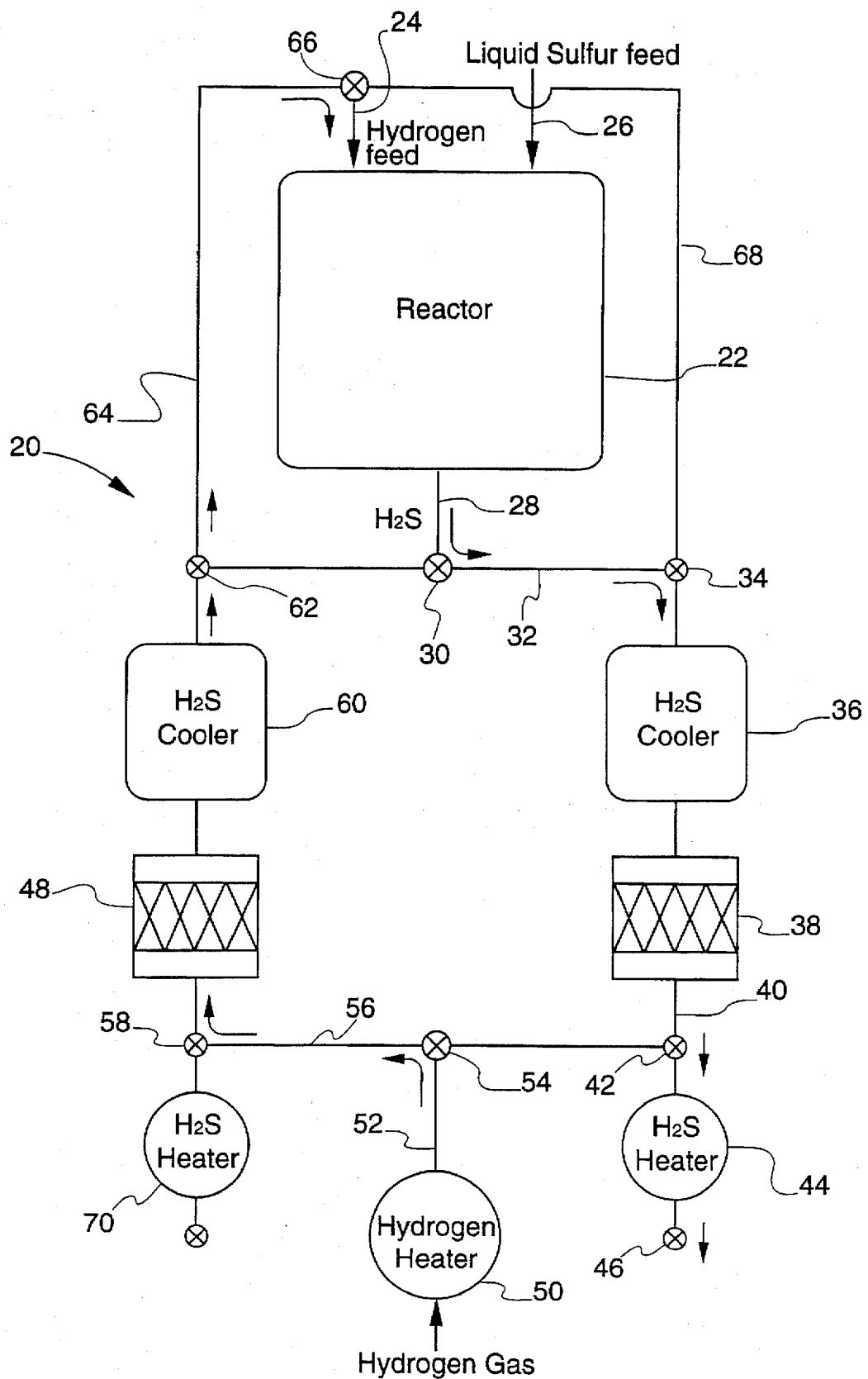
FIG. 2 is a schematic view of an alternative system for producing and purifying hydrogen sulfide gas and includes two parallel cleaning systems.

Referring to FIG. 2, an alternative embodiment of a system 20 for producing and purifying hydrogen sulfide gas will be described. System 20 operates in a manner similar to system 10, except that system 20 employs two parallel cleaning systems. During operation, one of the cleaning systems will be employed to remove impurities from the hydrogen sulfide gas while the other parallel system will be regenerated to remove any accumulated impurities.

System 20 includes a reactor 22 into which heated hydrogen gas is introduced through a hydrogen feed 24. Liquid sulfur is introduced into the reactor through a liquid sulfur feed 26. The hydrogen sulfide gas produced within reactor 22 exits through a line 28. A valve 30 directs the hydrogen sulfide gas through a line 32, through a valve 34, and into a hydrogen sulfide cooler 36. The hydrogen sulfide gas leaving cooler 36 enters into a molecular sieve 38 where impurities are removed from the hydrogen sulfide gas in a manner similar to that described in connection with FIG. 1. Hydrogen sulfide gas leaving molecular sieve 38 passes through a line 40, through a valve 42, and into a hydrogen sulfide heater 44 (with heater 44 being optionally provided to heat the hydrogen sulfide gas above its dew point). The hydrogen sulfide gas then passes through a valve 46 where it may be metered and transferred offsite.

While hydrogen sulfide gas produced by reactor 22 is being purified by passing through molecular sieve 38, a second molecular sieve 48 which is in parallel with molecular sieve 38 is regenerated to remove any accumulated impurities. Regeneration of molecular sieve 48 is as follows. Initially, hydrogen gas is introduced to a hydrogen heater 50 which heats the hydrogen gas to a minimum temperature of 120° C. Higher temperatures will reduce the regeneration time. The heated hydrogen gas exits heater 50 through a line 52, through a valve 54, through a line 56, through a valve 58 and into molecular sieve 48 as shown. The heated hydrogen gas passes through molecular sieve 48 in a direction that is generally opposite to the direction through which hydrogen sulfide gas is passed to purify the hydrogen sulfide gas. The heated hydrogen gas will assist in removing accumulated sulfur deposits from molecular sieve 48 and will carry the sulfur through a hydrogen sulfide cooler 60, through a valve 62, through a line 64, through a valve 66, and into hydrogen feed 24. In this manner, the heated hydrogen gas is employed not only to regenerate molecular sieve 48, but also serves as a feed into reactor 22 so that additional hydrogen sulfide gas may be produced and subsequently purified in molecular sieve 38 as previously described.

When molecular sieve 38 is ready to be regenerated, the appropriate valves are adjusted so that the hydrogen sulfide gas leaving reactor 22 passes through cooler 60 and into molecular sieve 48. At the same time, appropriate valves are adjusted so that the heated hydrogen gas leaving heater 50 passes through valve 42 and into molecular sieve 38 to regenerate molecular sieve 38. After leaving molecular sieve 38, the heated hydrogen gas flows through cooler 36, through valve 34, through a line 68, through valve 66 and into hydrogen feed 24 so that additional hydrogen sulfide gas may be produced. The hydrogen sulfide gas passing through molecular sieve 48 may optionally be passed through a hydrogen sulfide heater 70 to prevent any sulfur from dropping out as previously described.

The invention has now been described in detail for purposes of clarity and understanding. However, it will be appreciated that certain modifications and alterations may be practiced within the scope of the appended claims. Therefore, it is intended that the scope of the invention be determined in light of the appended claims and any equivalents thereto.

What is claimed is:

1. A method for purifying hydrogen sulfide gas having impurities therein, said impurities comprising sulfur particles and a hydrogen sulfide-sulfur polymer, the method comprising:

passing the hydrogen sulfide gas having the impurities through a filter media comprising a molecular sieve, wherein at least some of the hydrogen sulfide-sulfur polymers are broken down into hydrogen sulfide and sulfur, and wherein at least some of the impurities including the sulfur that was broken down from the hydrogen sulfide-sulfur polymer are trapped within the filter media.

2. A method as in claim 1, wherein the filter media includes a plurality of irregularly shaped internal pores into which the impurities are trapped.

3. A method as in claim 1, wherein the filter media comprises sand.

4. A method as in claim 2, wherein the filter media comprises carbon.

5. A method as in claim 1, wherein the filter media comprises activated alumina.

6. A method as in claim 1, wherein passing step further comprises removing a sufficient amount of impurities so that no more than about 10 parts per million of impurities are within the hydrogen sulfide gas after leaving the filter media.

7. A method as in claim 6, wherein passing step further comprises removing a sufficient amount of impurities so that no more than about 5 parts per million of impurities are within the hydrogen sulfide gas after leaving the filter media.

8. A method as in claim 1, further comprising passing heated hydrogen gas through the filter media comprising the molecular sieve to remove accumulated impurities therefrom.

9. A method as in claim 8, wherein the hydrogen gas is passed through the filter media comprising the molecular sieve in a direction that is opposite to the direction through which the hydrogen sulfide gas was passed.

10. A method as in claim 1, further comprising introducing the hydrogen sulfide gas from the filter media to a catalyst.

11. A method for purifying hydrogen sulfide gas having impurities therein, wherein at least some of the impurities comprise a hydrogen sulfide-sulfur polymer, the method comprising:

passing the hydrogen sulfide gas over a catalyst comprising a molecular sieve, wherein the catalyst breaks down the hydrogen sulfide-sulfur polymer to hydrogen sulfide and sulfur; and removing at least some of the sulfur including the sulfur that is broken down from the hydrogen sulfide-sulfur polymer from the hydrogen sulfide gas by passing the hydrogen sulfide through a filter media selected from the group consisting of molecular sieve, sand, carbon and activated alumina after the hydrogen sulfide gas is passed over the catalyst, wherein at least some of the sulfur is trapped within the filter media.

12. A method as in claim 11, wherein the filter media includes a plurality of irregularly shaped internal pores into which the impurities are trapped.

13. A method as in claim 11, wherein at least some of the impurities comprise sulfur particles.

14. A method as in claim 11, wherein a sufficient amount of impurities are removed so that no more than about 10 parts per million of impurities are within the hydrogen sulfide gas after leaving the filter media.

15. A method as in claim 14, wherein a sufficient amount of impurities are removed so that no more than about 5 parts per million of impurities are within the hydrogen sulfide gas after leaving the filter media.

16. A method as in claim 11, further comprising passing heated hydrogen gas through the filter media to remove accumulated impurities therefrom.

17. A method as in claim 16, wherein the hydrogen gas is passed through the filter media in a direction that is opposite to the direction through which the hydrogen sulfide gas was passed.

18. A method for purifying hydrogen sulfide gas having impurities therein, wherein at least some of the impurities comprise a hydrogen sulfide-sulfur polymer, the method comprising:

passing the hydrogen sulfide gas over a catalyst comprising a molecular sieve, wherein the catalyst breaks down the hydrogen sulfide-sulfur polymer to hydrogen sulfide and sulfur;

removing at least some of the sulfur from the hydrogen sulfide gas by passing the hydrogen sulfide gas through a filter media, wherein at least some of the sulfur is trapped within the filter media comprising a molecular sieve; and passing heated hydrogen gas through the filter media in a direction that is opposite to the direction through which the hydrogen sulfide gas was passed to remove accumulated impurities therefrom.

* * * * *